(12) United States Patent
D'Amato et al.

(10) Patent No.: US 9,168,949 B2
(45) Date of Patent: Oct. 27, 2015

(54) STEERING SYSTEM CLATTER MITIGATION

(71) Applicant: FORD GLOBAL TECHNOLOGIES, LLC, Dearborn, MI (US)

(72) Inventors: Anthony Mario D'Amato, Canton, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 13/865,477

(22) Filed: Apr. 18, 2013

(65) Prior Publication Data

US 2014/0316656 A1  Oct. 23, 2014

(51) Int. Cl.
*B62D 5/04* (2006.01)
*B62D 6/06* (2006.01)
*B62D 7/22* (2006.01)

(52) U.S. Cl.
CPC ............ *B62D 5/0475* (2013.01); *B62D 5/0472* (2013.01); *B62D 6/06* (2013.01); *B62D 7/226* (2013.01)

(58) Field of Classification Search
CPC ........ B62D 6/06; B62D 7/226; B62D 5/0472; B62D 5/0475; B62D 15/00; B62D 1/00
USPC ....................................... 701/41, 42
See application file for complete search history.

(56) References Cited

U.S. PATENT DOCUMENTS

| 5,631,529 | A  | * | 5/1997  | Shimizu et al. | ............... 318/432 |
| 7,909,131 | B2 |   | 3/2011  | Nishimura      |                        |
| 8,180,529 | B2 |   | 5/2012  | Suzuki         |                        |
| 8,267,220 | B2 |   | 9/2012  | Sugiyama et al.|                        |
| 2005/0284251 | A1 | * | 12/2005 | Inayoshi et al. | ................. 74/492 |
| 2008/0277192 | A1 | * | 11/2008 | Nishimura      | ..................... 180/444 |

* cited by examiner

*Primary Examiner* — Helal A Algahaim
*Assistant Examiner* — Genna Mott
(74) *Attorney, Agent, or Firm* — Raymond L. Coppiellie; Brooks Kushman P.C.

(57) ABSTRACT

A steering system clatter mitigation apparatus and method. The clatter mitigation apparatus excites the steering system at a frequency within a range of an existing engine noise. The excitation of the steering system at a different frequency than the clatter sound greatly reduces the clatter sound. The sound produced by the excitation of the steering system is masked by the existing sound of the engine.

16 Claims, 2 Drawing Sheets

STEERING SYSTEM CLATTER MITIGATION

TECHNICAL FIELD

This disclosure relates to the mitigation of an audible clatter which may emanate from a vehicular steering system, and specifically the excitation of the steering system to produce an audible noise within a frequency range of other audible vehicle components to mask the noise of the steering system.

BACKGROUND

Steering systems in vehicles use a variety of shafts and gears to transfer a steering input from a steering wheel to turn wheels on the vehicle. Steering systems may use a gearbox to transfer the rotational input of the steering wheel to translational movement of the wheels left and right. Some gearboxes include a rack and pinion, a recirculating ball, or a worm and sector mechanism to transfer the rotational movement of the steering wheel to the translational movement of the wheels. Power steering systems help drivers steer vehicles by augmenting steering effort of the steering wheel. Hydraulic or electric actuators may add controlled energy to the steering mechanism, so the driver needs to provide only modest effort regardless of conditions. The actuators are often connected to the steering system through additional sets of gearing.

The gears used in the gearboxes and the connection of the actuators may generate an undesirable noise described as clatter. The clatter may be more prevalent when the vehicle is driving straight and over bumps. The source of the noise is suspected to be gear lash between the gears. In the case of a rack and pinion mechanism, the source of the noise is suspected to be the gear lash between the rack and the motor pinion and/or the rack and the steering pinion. While the clatter may not be felt by the driver through the steering column, an audible clatter may emanate from the steering system that can be heard inside the vehicle cabin.

The above problem(s) and other problems are addressed by this disclosure as summarized below.

SUMMARY

One aspect of this disclosure is directed to an audible clatter mitigation apparatus for a steering system of a vehicle. The apparatus has an actuator connected to the steering system, and a controller programmed to actuate the actuator causing steering system components and gear sets associated therewith to excite at a frequency within that of an engine noise frequency range. The apparatus may include a vibration sensor connected to the steering system, and the controller may excite the steering system in response to the vibration sensor indicating that the steering system is vibrating within a threshold vibration range. The threshold vibration range may be that in which an audible clatter emanates from the steering system of the vehicle.

The controller may be in communication with an engine and only excites the steering system when the engine is running. The controller may be in communication with an electric power assist motor and only excites the steering system when the electric power assist motor is not being energized. The controller may be in communication with a steering rack motor and only excites the steering system when the steering rack motor is under a threshold torque value. The threshold torque value may be above or below a torque range in which an audible clatter emanates from the steering system of the vehicle. The controller may be in communication with a steering wheel angle sensor and only excites the steering system when there is an indication of substantially no steering input.

The actuator may be an electric power assist motor. The actuator may be a steering rack motor. The actuator may actuates at a sinusoidal frequency, and the sinusoidal frequency may be a function of a steering rack motor torque and engine noise frequency. Engine noise may be lower than 50 Hz, and the steering system may be excited to a frequency lower than 50 Hz to mask the generated sound behind the engine noise. By exciting the steering system and generating a sound lower than 50 Hz, any clatter that may exist at higher frequency levels may be significantly reduced.

Another aspect of this disclosure is directed to a power-steering clatter mitigation system for a vehicle. This system has a rack connecting two wheels and a pinion operable to linearly traverse the rack and turn the wheels. A motor is used to assist in the movement of the rack in response to a steering input. In this system, a controller is also programmed to utilize the motor when it is not being used to assist in steering the vehicle to excite the rack and pinion at a frequency within an audible engine frequency range.

A further aspect of this disclosure is directed to a method of mitigating a steering rack clatter. The method includes generating an input frequency on a steering rack in response to an input criteria. The generated input frequency causes the steering rack to excite at a frequency that is within that of an engine noise frequency range. The input criteria may be selected from any one or a combination of an electronic power assist motor being not being used by a power steering system, a steering rack motor torque being lower than a threshold torque value, a steering wheel angle sensor indicating no steering input, a vibration sensor indicating a steering system vibration within a threshold vibration range, or an engine running.

The input frequency used in this method may be a sinusoidal frequency that is a function of a steering rack motor torque and an engine noise frequency. The generated input frequency is used to encourage vibrational noise generated from the steering rack to shift from a clatter frequency range to an engine noise frequency range.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
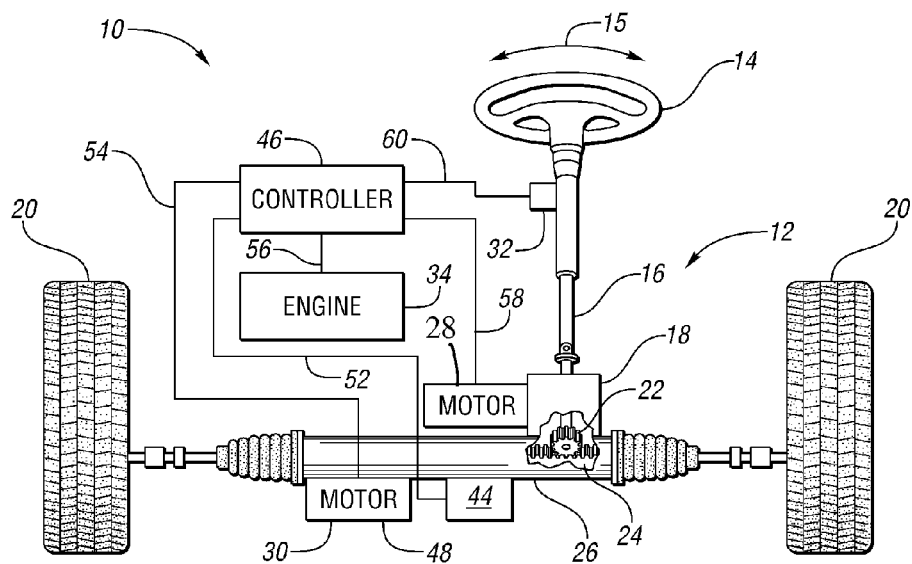
FIG. 1 is a diagrammatic view of a power-steering clatter mitigation system.

FIG. 1 shows a power-steering clatter mitigation system 10 being used in conjunction with a rack and pinion type electronic power assisted steering (EPAS) system 12, although other steering systems may be used. The steering system 12 has a steering wheel 14 that is capable of being rotated by a driver (not shown) and providing a steering input as indicated by arrow 15. This steering input 15 is translated to a steering-wheel shaft 16 and into a gearbox 18. The gearbox 18 may house a gear set to translate the rotational movement of the steering-wheel shaft 16 into a translational movement to turn wheels 20. In this embodiment, the translation occurs between a pinion 22 and a rack 24. The pinion 22 is transversely fixed in the gearbox 18, rotates in response to the steering input 15, and linearly traverses the rack 24 within the steering rack assembly 26. The rack 24 may be disposed within a steering rack assembly 26, and may be operatively connect the wheels 20 with each other and turn the wheels 20 together. The transversing movement of the rack 24 turns the wheels 20 from left to right.

Hydraulic and electric power assist devices may be utilized with the steering system 12 to provide power assistance to turn the wheels 20. A first electric power assist motor 28 may be connected to the gearbox 18. The first electric power assist motor 28 may provide power assistance to aid in the rotation of the steering-wheel shaft 16 during a steering input 15. A second electric power assist motor 30 may be connected to the steering rack assembly 26 to aid in the traversing of the rack 24 during a steering input 15. The second electric power assist motor 30 may be a steering rack motor. The steering rack motor 30 may produce a torque when assisting in the movement of the rack 24. A steering wheel angle sensor 32 may be connected to the steering system 12 and may be capable of measuring a steering wheel angle and identifying a steering input 15. The electric power assist motors 28, 30 may be energized in response to the steering wheel angle sensor 32 indicating a steering input 15. Other systems are contemplated in which electric power assist motors 28, 30 are not provided.

An engine 34 may be used as a prime mover of the vehicle (not shown) to which the steering system 12 is connected to. The engine 34 may drive the wheels 20 and/or other wheels on the vehicle (not shown). The engine 34, when running, may produce an audible sound generally referred to as engine noise 40 (see FIG. 3a). Engine noise 40 may vary in frequency range. In one example the engine noise 40 is in a frequency range lower than 50 Hz.

An audible clatter 42 (see FIG. 3a) may emanate from the steering system 12 when the vehicle is driven. The source of the clatter may be gear lash between the gears of the steering system 12. For example, in the case of a rack and pinion mechanism, the source of the clatter may be the gear lash between the rack 24 and the steering pinion 22, the rack 24 and a motor pinion (not shown) that connects the steering rack motor 30 to the rack 24, the rack 24 and the steering rack assembly 26, or any combination of the above. The audible clatter 42 is most often generated when the steering system 12 experiences a specific level of vibration, for example when the vehicle drives over a certain kind of road roughness at a certain speed. A vibration sensor 44 may be connected to the steering system 12 to measure such a vibration. The vibration sensor 44 may be connected to the steering rack assembly 26, as shown, directly on the rack 24, or to any other steering system component or even to the vehicle itself.

Figure 3A:
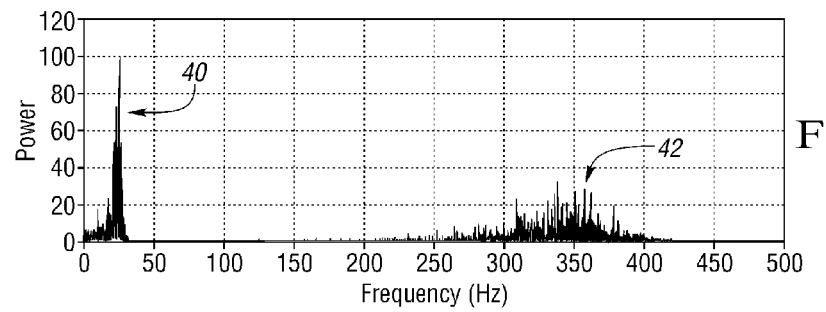
FIG. 3a is a chart showing sound being produced by an engine and clatter emanating from a steering system without a clatter mitigation system being used.
Figure 3B:
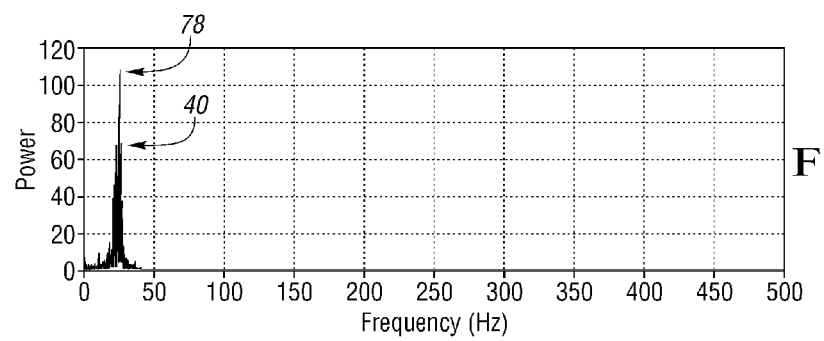
FIG. 3b is a chart showing sound being produced by a steering system being masked by sound being produced by an engine when a clatter mitigation system is being used.

A controller 46 is programmed to actuate an actuator 48 causing the steering system 12 to excite at a frequency within that of an engine noise frequency range 40 (see FIG. 3b). The actuator 48 may excite the entire steering system 12, or may be used to excite different components and/or gear sets 22, 24 within the steering system 12. The actuator 48 may be connected to any portion of the steering system 12. The actuator 48 may be a separate motor, or the actuator may be one of the existing electric power assist motors 28, 30. The actuator 48, as shown here, is the steering rack motor 30. The actuator 48 may be capable of generating a frequency input causing the steering system 12 to excite at a frequency range that is masked by an existing engine noise 40 (see FIG. 3b). In another embodiment, the actuator 48 may excite the steering system 12 to produce a sound under 50 Hz. Exciting the steering system 12 at a frequency range within that of engine noise 40 shifts the sounds emanating from the steering system virtually illuminating the clatter while not adding a noticeable difference in existing cabin noise.

The actuator 48 may be tuned to excite the steering system 12 to vibrate at 25 Hz. The actuator 48 may actuate at a sinusoidal frequency. The excited frequency may be a function of a steering rack motor torque and engine noise frequency. The frequency input may be written as an equation: $u=A \sin(\omega t)$, where u is the frequency input, w is an existing frequency of engine noise, t is time, and A is a steering rack torque value greater than $\delta$, where $\delta$ is from a torque range where clatter is not present ($-\delta<T<\delta$).

The potential issue of steering drift (similar to drift caused by wheel misalignment) may be eliminated by choosing a zero mean signal. Furthermore, the controller 46 may be programmed to be open loop and can be turned on and off dependent on road roughness indices, thereby reducing unwanted wear on the actuator 48, and eliminating potential stability issues associated with closed loop methods.

The controller 46 may be in communication with the vibration sensor 44 as indicated by communication line 52. Communication line 52, as with all communication lines to be discussed, may be a wire connected directly from the controller 46 to the component that the controller 46 is communicating with, it may represent a signal being transmitted wirelessly between components, or it may represent the controller having access to data provided by the component through an internal communications network (not shown). The controller 46 may be programmed to actuate the actuator 48 through communication line 54 in response to the vibration sensor 44 indicating that the steering system 12 is vibrating within a threshold vibration range. The threshold vibration range may be a range of vibration in which an audible clatter 42 emanates from the steering system 12. The threshold vibration range may be between 100 and 500 Hz.

In another embodiment vibration signals may be received from the vehicle's suspension system (not shown). The controller 46 may be programmed to actuate the actuator 48 and excite the steering system 12 when the vehicle suspension system exhibits vibrations in a range that may cause clatter in the steering system 12.

The controller 46 may be in communication with an engine 34 as indicated by communication line 56. The controller 46 may be capable of ascertaining whether or not the engine 34 is running, and thus producing an audible engine noise 40. The controller 46 may be programmed to only actuate the actuator 48 in response to the engine 34 running.

The controller 46 may be in communication with an electric power assist motor 28, 30, as indicated through communication lines 54, 58. The controller 46 may be programmed to only actuate the actuator 48 in response to the electric power assist motor 28, 30 not being energized. This control methodology may be utilized to allow the electric power assist motor 28, 30 to be utilized first and foremost for assisting in the steering of the vehicle. This methodology may also be implemented since an audible clatter 42 may not be present when electric power assist motors 28, 30 are being used, as the electric power assist motors 28, 30 place the gears in contact with each other and they do not have lash that may allow clatter to occur. The controller 46 may be in communication with the steering rack motor 30 specifically, and capable of receiving indications of steering rack motor torque. The controller 46 may be programmed to only actuate the actuator 48 in response to the steering rack motor 30 experiencing threshold torque values. The threshold torque value may be above and below zero torque. The threshold torque values may also be above and below a torque range in which an audible clatter 42 continues to emanate from the steering system 12.

The controller 46 may also be programmed to utilize the actuator 48 to excite the steering system 12 at a frequency within an audible engine frequency range in response to an absence of a steering input 15. The steering input 15 may bring the pinion 22 into contact with the rack 24 thus reducing gear lash and reducing clatter. The clatter may only be slightly reduced at small steering inputs 15 and greatly reduced, if not eliminated from hearing completely, at a specific rotational threshold of the steering wheel 14. The controller 46 may be in communication with a steering wheel angle sensor 32 as indicated by communication line 60. The controller 46 may be capable of receiving indications of steering input 15 from the steering wheel angle sensor 32 and actuating the actuator 48 in response to an indication of substantially no steering input, or a steering input 15 below the specific rotational threshold where clatter is greatly reduced.

Figure 2:
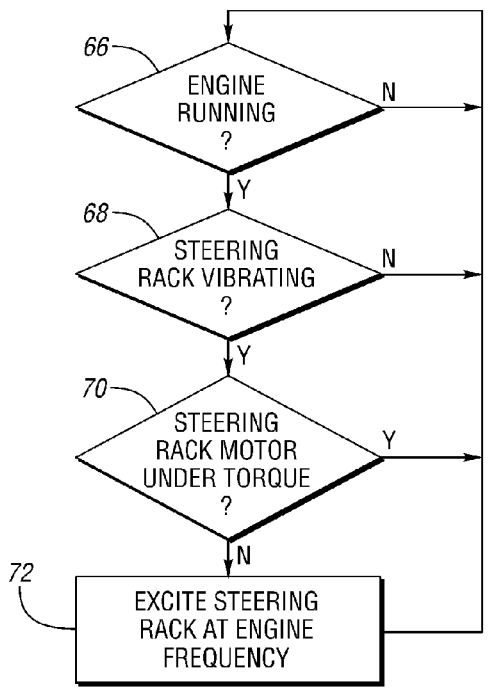
FIG. 2 is a flow chart showing a method of mitigating a steering rack clatter.

FIG. 2 is a logic flow chart showing one embodiment of a method to mitigate a steering rack clatter. The controller 46 may be programmed to ascertain whether an engine is running, as shown at step 66, whether a steering rack is experiencing vibration, as shown at step 68, and whether a steering rack motor us under torque, as shown at step 70. The logic steps may be performed in any order, such that if an engine is running, if the steering rack is vibrating, and if the steering rack motor is not under torque, then the steering rack is excited at a frequency within that of the engine noise frequency range, as shown at step 72. Step 68 may be set at a threshold vibration range such that only vibrations of the steering system 12 within a certain range where an audible clatter 42 may be produced are used, as opposed to just any vibration level. Similarly, step 70 may be set at a threshold torque range such that the threshold torque range is set at a value when no torque is present, or when a low torque value is present, that an audible clatter 42 may still emanate from the steering system 12.

FIG. 3a is a chart showing sound being produced by an engine known as engine noise 40 and clatter 42 emanating from a steering system without a clatter mitigation system being used. The engine noise 40 is shown in a range below 50 Hz and a power level up to approximately 100. The clatter 42 is shown in a range most noticeable between 250 Hz and 400 Hz. The clatter 42 appears to have a peak power of approximately 30 around 350 Hz. In this chart the engine RPM is set at 1500 RPM or 25 Hz.

FIG. 3b is a chart showing the sound characteristics of the same vehicle from FIG. 3a but with a clatter mitigation system being used. The engine noise 40 can still be seen, but the clatter 42 is significantly reduced. The overall power rating below 50 Hz has been increased by approximately 5, as indicated at 78. The power increase is caused by the correction signal of the clatter mitigation system and the steering system components being excited at a frequency below 50 Hz. Clatter 42, as shown in FIG. 3a, may span in a frequency range from 100 Hz to 500 Hz, but this frequency range should not be considered limiting, as the clatter mitigation system may reduce and eliminate audible noises emanating from the steering system 12 at any frequency level.

Figure 4A:
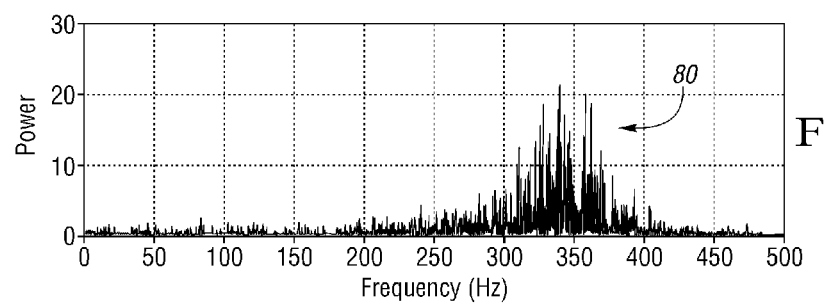
FIG. 4a is a chart showing clatter emanating from a steering system without a clatter mitigation system being used and with the engine off.
Figure 4B:
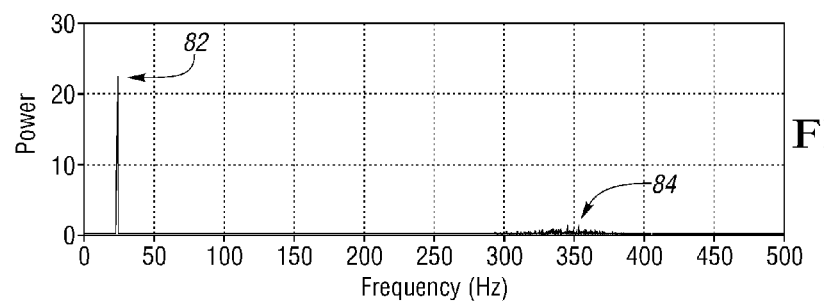
FIG. 4b is a chart showing sound being produced through a steering system when a clatter mitigation system is being used and the engine is off.

FIG. 4a is a chart showing a clatter 80 emanating from a steering system on a vehicle that has the engine turned off. This chart shows greater resolution to the clatter frequency range being mostly between 200 to 450 Hz. FIG. 4b is a chart showing the sound characteristics of the same vehicle from FIG. 4b, but this time with a clatter mitigation system being used. The clatter mitigation system excites the steering system at 25 Hz and produces a sound at approximately 25 Hz with a power rating of approximately 22, as shown at 82. A small amount of sound 84 may still be seen in the 300 to 400 Hz range where the clatter 80 used to be, but this level of sound is not detectable by the human ear. This chart shows that by exciting the steering system at 25 Hz, the clatter 80 that exists above the 50 Hz frequency is all but eliminated.

The clatter reduction system only increased the sound levels below 50 Hz by approximately 5 power levels when the engine was running, and approximately 22 when the engine is not running. This shows the system being more effective to use when the engine is running, however in the case of a hybrid vehicle it still may be advantageous to operate the clatter reduction system, as a sound similar to that of an engine running may be more acceptable to the ears of drivers and passengers than a clatter sound. As well, the clatter frequency need not be known, as the excitation of the steering system components will virtually eliminate any clatter frequency above 50 Hz.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. An audible clatter mitigation apparatus for a steering system of a vehicle, the apparatus comprising:
   an actuator connected to the steering system; and
   a controller programmed to actuate the actuator at a sinusoidal frequency that is a function of a steering rack motor torque and an engine noise frequency, causing steering system components and gear sets associated therewith to excite at a frequency within that of an engine noise frequency range.

2. The apparatus of claim 1 further comprising a vibration sensor connected to the steering system, wherein the controller is in communication with the vibration sensor, and the controller actuates the actuator in response to the vibration sensor indicating that the steering system is vibrating within a threshold vibration range.

3. The apparatus of claim 2 wherein the threshold vibration range is a range of vibration in which an audible clatter emanates from the steering system of the vehicle.

4. The apparatus of claim 2 wherein the threshold vibration range is between 100 and 500 Hz.

5. The apparatus of claim 1 wherein the actuator is an electric power assist motor.

6. The apparatus of claim 1 wherein the actuator is connected to a steering rack of the steering system.

7. The apparatus of claim 1 wherein the excited frequency is lower than 50 Hz.

8. The apparatus of claim 1 wherein the excited frequency is 25 Hz.

9. The apparatus of claim 1 wherein the controller is in communication with an engine and the controller actuates the actuator in response to the engine running.

10. The apparatus of claim 1 wherein the controller is in communication with an electric power assist motor in the steering system, and the controller actuates the actuator in response to the electric power assist motor not being energized.

11. The apparatus of claim 1 wherein the controller is in communication with an electric power assist motor connected to a steering rack of the steering system, the controller is capable of receiving indications of steering rack motor torque, and the controller actuates the actuator in response to threshold steering rack motor torque values.

12. The apparatus of claim 11 wherein the threshold steering rack motor torque values are above and below a torque range in which an audible clatter emanates from the steering system of the vehicle.

13. The apparatus of claim 1 wherein the controller is in communication with a steering wheel angle sensor connected to the steering system, the controller is capable of receiving indications of steering input through the steering wheel angle sensor, and the controller actuates the actuator in response to an indication of substantially no steering input.

14. A method of mitigating a steering rack clatter comprising:
generating a sinusoidal input frequency on a steering rack in response to an input criterion, wherein the sinusoidal input frequency is a function of a steering rack motor torque and an engine noise frequency, and the generated sinusoidal input frequency causes the steering rack to excite at a frequency that is within that of an engine noise frequency range.

15. The method of claim 14 wherein the generated input frequency encourages vibrational noise generated from the steering rack to shift from a clatter frequency range to an engine noise frequency range.

16. The method of claim 14 wherein the input criterion is selected from a group consisting of an electronic power assist motor not being used by a power steering system, the steering rack motor torque being lower than a threshold torque value, a steering wheel angle sensor indicting no steering input, a vibration sensor indicating a steering system vibration within a threshold vibration range, and an engine running.

* * * * *